US006058026A

United States Patent [19]

Rozman

[11] Patent Number: 6,058,026

[45] Date of Patent: May 2, 2000

[54] MULTIPLE OUTPUT CONVERTER HAVING A SINGLE TRANSFORMER WINDING AND INDEPENDENT OUTPUT REGULATION

[75] Inventor: Allen F. Rozman, Richardson, Tex.

[73] Assignee: Lucent Technologies, Inc., Murray Hill, N.J.

[21] Appl. No.: 09/360,679

[22] Filed: Jul. 26, 1999

[51] Int. Cl.[7] .................................................... H02M 3/335

[52] U.S. Cl. ................................. 363/16; 363/21; 363/97

[58] Field of Search ................................. 363/15, 16, 20, 363/21, 22, 84, 95, 97, 126, 127, 131

[56] References Cited

U.S. PATENT DOCUMENTS

| | | | |
|---|---|---|---|
| 5,274,543 | 12/1993 | Loftus, Jr. | 363/127 |
| 5,282,123 | 1/1994 | Boylan et al. | 363/21 |
| 5,291,382 | 3/1994 | Cohen | 363/16 |
| 5,303,138 | 4/1994 | Rozman | 363/21 |
| 5,327,333 | 7/1994 | Boylan et al. | 363/21 |
| 5,490,055 | 2/1996 | Boylan et al. | 363/41 |
| 5,528,482 | 6/1996 | Rozman | 363/21 |
| 5,541,828 | 7/1996 | Rozman | 368/21 |
| 5,590,032 | 12/1996 | Bowman et al. | 363/15 |
| 5,625,541 | 4/1997 | Rozman | 363/21 |
| 5,663,876 | 9/1997 | Newton et al. | 363/126 |
| 5,726,869 | 3/1998 | Yamashita et al. | 363/21 |
| 5,870,299 | 2/1999 | Rozman | 363/127 |
| 5,872,705 | 2/1999 | Loftus, Jr. et al. | 363/21 |

OTHER PUBLICATIONS

Cherry Semiconductor Corporation "Secondary Side Post Regulator for AC/DC and DC/DC Multiple Output Converters CS–5101", pp. 1–7, Mar., 1997.

Cherry Semiconductor Corporation "Secondary Side Post Regulator (SSPR) for Switching Power Supplies with Multiple Outputs CS 5101 Application Note", pp. 1–13, Apr., 1997.

Levin, G. "A New Secondary Side Post Regulator (SSPR) PWM Controller for Multiple Output Power Supplies", Proceedings APEC, 1995, pp. 736–742. (No month).

*Primary Examiner*—Y. J. Han
*Attorney, Agent, or Firm*—Locke Liddell & Sapp LLP

[57] ABSTRACT

A DC—DC converter includes a transformer having a primary winding and a secondary winding. The secondary winding includes first and second terminals. An input circuit is connected to the primary winding for coupling an input DC voltage to the primary winding. A first output channel is connected to the first terminal of the secondary winding, and is connected to a first output. The first channel includes a first switch connected in series with a first inductor. A second output channel is connected to the second terminal of the secondary winding, and is connected to a second output. A first and a second capacitor connect the first and second outputs to a return lead. A second switch connects the first output channel to the return lead. A third switch connects the second output channel to the return lead. A pulse width modulator is connected between one of the outputs to drive the input circuit. A pulse width modulator is connected between the first output and the first switch for regulating the duty ratio of the first output channel independently of the second output channel.

10 Claims, 5 Drawing Sheets

10
12
14
16
16a
16b
ns
np
18
$V_{IN}$
20
30
32
D
(1-D)
34
38
40
$V_{out1}$
$V_{out2}$
44
46
50
52
54
56
58
60
62
66
PWM
70
SW
72
PWM 10
$V_{out1}$
$V_{out2}$
38
40
60
62
50
52
58
54
56
72
PWM
44
70
SW
66
PWM
16a
16
ns
16b
46
30
12
14
np
D
32
(1-D)
34
20
18
$V_{IN}$ 10
Vout1
Vout2
60
62
50
58
52
72
PWM
66
PWM
76
78
44
SW
70
FET DRIVE
80
16a
16
16b
ns
46
12
np
14
20
30
34
34
D
(1-D)
18
VIN

MULTIPLE OUTPUT CONVERTER HAVING A SINGLE TRANSFORMER WINDING AND INDEPENDENT OUTPUT REGULATION

TECHNICAL FIELD OF THE INVENTION

The present invention relates to DC—DC power converters, and more particularly to a multiple output converter with closed loop independent regulation of the outputs using minimal components.

BACKGROUND OF THE INVENTION

DC—DC converters are normally used as constant DC voltage power supplies. The desirability of having a DC—DC converter that provides a number of different voltage outputs to a number of different independent loads has been recognized. There is a continuing need for such a circuit which has the advantages of clamped mode circuits, is of relatively simple construction and relatively inexpensive, and which provide stable voltage levels to a number of independent loads that, if desired, can be electrically isolated. With electrical isolation, noise, impedance changes, and the like from one load would not affect the power transmitted to another load.

Multiple output DC—DC converters providing a regulated voltage have typically required separate outputs provided by separate transformer windings as well as independent direct voltage regulating controls for each output where precise regulation is required. In a typical forward or flyback converter with multiple outputs, the non-conduction intervals of the power switch may result in a non-continuous transfer of energy to the output which results in an inefficient transfer of energy to the output.

It is desirable to independently regulate the outputs of a converter while minimizing the number of circuit components.

SUMMARY OF THE INVENTION

In accordance with the present invention, a DC—DC converter is provided. The converter includes a transformer having a primary winding and a secondary winding. The secondary winding includes first and second terminals. An input circuit is connected to the primary winding for coupling an input DC voltage to the primary winding. A first output channel is connected to the first terminal of the secondary winding, and is connected to a first output. The first channel includes a first switch connected in series with a first inductor. A second output channel is connected to the second terminal of the secondary winding, and is connected to a second output. A first and a second capacitor connect the first and second outputs to a return lead. A second switch connects the first output channel to the return lead. A third switch connects the second output channel to the return lead. A pulse width modulator is connected between one of the outputs to drive the input circuit. A pulse width modulator is connected between the first output and the first switch for regulating the duty ratio of the first output channel independently of the second output channel.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
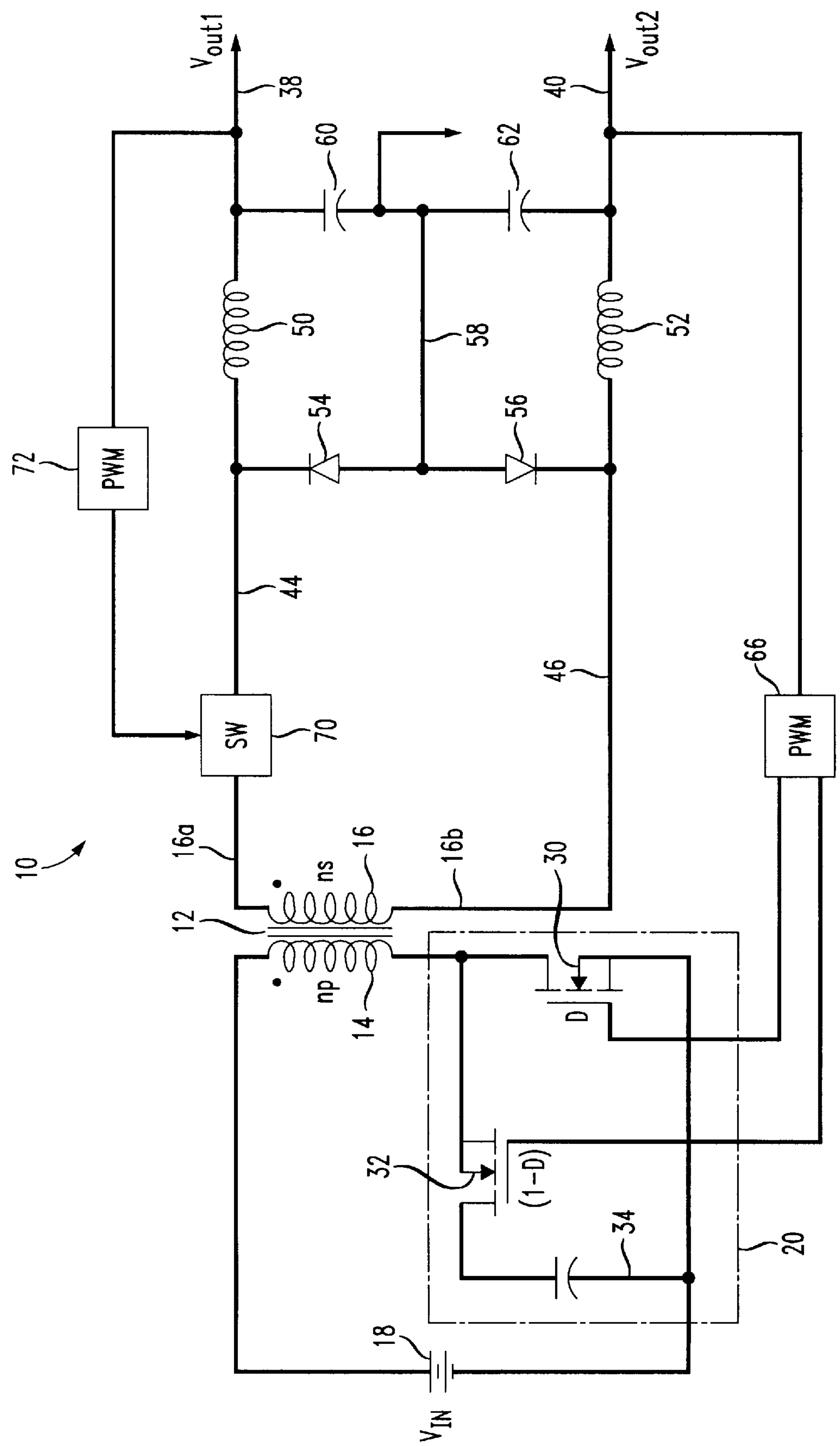
FIG. 1 is a schematic of an exemplary embodiment of the present DC—DC converter.

Referring to FIG. 1, a schematic diagram of an exemplary embodiment of the present DC—DC converter circuit is illustrated, and is generally identified by the numeral 10. Converter 10 includes a transformer 12 having a primary winding 14 and a secondary winding 16. Secondary winding 16 includes terminals 16*a* and 16*b*. A DC input voltage 18 is applied to primary winding 14 of transformer 12 under the control of an input circuit, generally identified by the numeral 20. Any input circuit capable of driving the primary winding of the transformer with a bi-polar excitation, either with or without dead time, is suitable for use with the present invention. Input circuits that generally do not exhibit dead time may comprise, for example, a zero voltage switching half bridge circuit, an active clamp circuit as illustrated in FIG. 1, or a two transformer active clamp circuit. Input circuits that generally exhibit dead time may comprise, for example, a push-pull circuit, a hard switching half-bridge, or a full-bridge. For a more complete discussion of alternative input circuits, see the following reference, incorporated herein be reference in its entirety: *Principles of Power Electronics*, by J. Kassakian, M. Schlecht, and G. Verghese, Addison-Wesley Publishing Company, 1991.

For a more detailed example of alternative input circuits and synchronous rectifier topologies, see the following patents, all incorporated herein by reference in their entirety: (1) U.S. Pat. No. 5,528,482 to Rozman, entitled Low Loss Synchronous Rectifier for Application to Clamped-Mode Power Converters, issued Jun. 18, 1996; (2) U.S. Pat. No. 5,274,543 to Loftus, entitled Zero Voltage Switching Power Converter Circuit with Loss-less Synchronous Rectifier Gate Drive, issued Dec. 28, 1993; and (3) U.S. Pat. No. 5,291,382 to Cohen entitled Pulse Width Modulated DC/DC Converter with Reduced Ripple Current Component Stress and Zero Voltage Switching Capability issued Mar. 1, 1994; and (4) U.S. Pat. No. 5,590,032 to Bowman et al., entitled Self Synchronized Drive Circuit for a Synchronous Rectifier in a clamped-mode Power Converter, issued Dec. 31, 1996.

Input circuit 20 in the form of a clamping circuit includes a FET power switch 30 which is periodically biased conducting to enable current flow, in response to input voltage 18 through primary winding 14 of transformer 12 for the duration D as a part of the periodic cycle. A clamping circuit including a series connected FET switch 32 and a capacitor 34 is connected in parallel with switch 30. Switch 32 is enabled conducting during the (1−D) portion of the periodic cycle. The voltage stored on capacitor 34 is charged to a level VC1 and clamps the voltage of transformer 12 primary winding 14 to a substantially constant average level $V_{in}/(1-D)$ during the non-conduction of switch 30.

Power output from secondary winding 16 of transformer 12 is connected to first and second outputs 38 and 40 via first and second output channels 44 and 46, respectively. First output channel 44 is connected to terminal 16*a* of secondary winding 16 and includes an inductor 50. Second output channel 46 is connected to terminal 16*b* of secondary winding 16 and includes an inductor 52. Diodes 54 and 56 are connected, respectively, to first output channel 44 and second output channel 46 and both are connected to a return lead 58. Capacitors 60 and 62 connect the outputs 38 and 40 to the ground of the return line to stabilize the output voltages.

The outputs 38 and 40 of converter 10 are equal in magnitude and opposite in polarity. The volt second product in the transformer 12 is controlled to be substantially equal in each cycle switching period, during the non-conduction and conduction intervals of switch 30. The clamping series circuit of switch 32 and capacitor 34 allows the two inputs to be regulated in response to only one output voltage sense lead. A constant square wave voltage is provided in response to the clamp circuit to the secondary winding 16 of transformer 12. For a more detailed example of alternative multiple output rectifier topologies, see the following patent, incorporated herein by reference in its entirety: U.S. Pat. No. 5,541,828 to Rozman, entitled Multiple Output Converter with Continuous Power Transfer to an Output and With Multiple Output Regulation, issued Jun. 30, 1996.

Drive control for switches 30 and 32 is provided by a pulse width modulator 66 providing the drive to switches 30 and 32. Pulse width modulator 66 operates to control the quality of the volt second product of power transformer 12 during conduction and non-conduction of the power switch 30 in each cyclic interval of converter 10. Capacitor 34 is charged to a value $V_{in}/(1-D)$ during the (1−D) portion of the switching cycle and energy in the magnetizing inductance of transformer 12 is transferred, via inductor 52 to the output 40. During the D portion of the switching cycle, energy from input 18 is coupled from the secondary winding 16 via inductor 50 to the output 38.

An important aspect of the present invention is the use of a control switch 70 interconnected in output channel 44 which functions to regulate the duty ratio effectively applied to output 38, thus regulating the output 38 independently of output 40. The on/off cycle time of control switch 70 is controlled from the output 38 via a pulse width modulator 72. By controlling the cycle time of control switch 70, output 38 can be regulated without interfering with the operation of output 40. Only control switch 70 and diodes 54 and 56 are needed to rectify outputs 38 and 40 compared to prior art converters which require at least four rectifiers.

Figure 2:
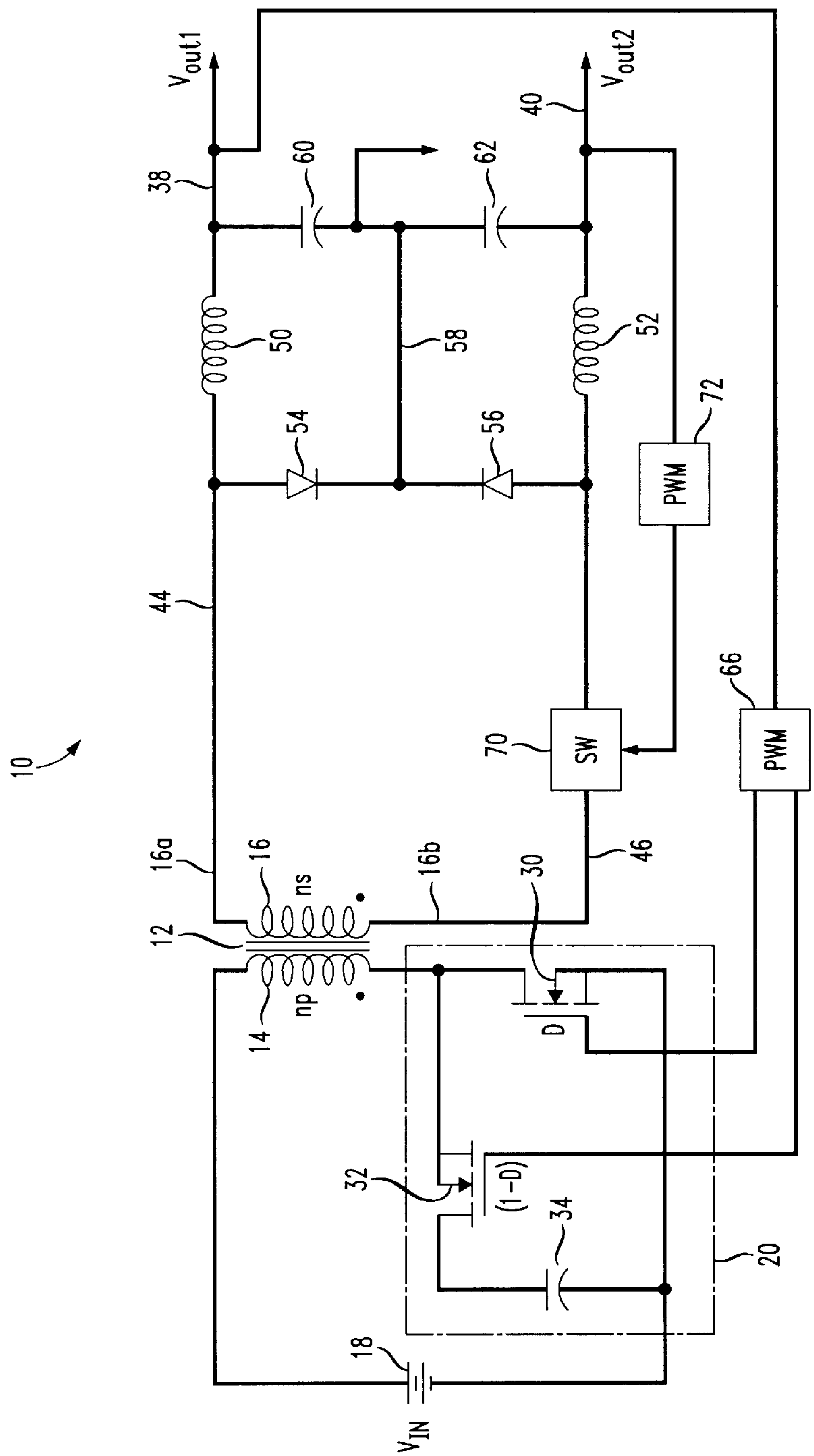
FIG. 2 is a schematic of an additional embodiment of the present DC—DC converter.

FIG. 2 illustrates the present converter 10 in which switch 70 is connected within output channel 46 in order to regulate output 40. The polarity of transformner 12 is reversed in this configuration.

Figures 3A, 3B, 3C:
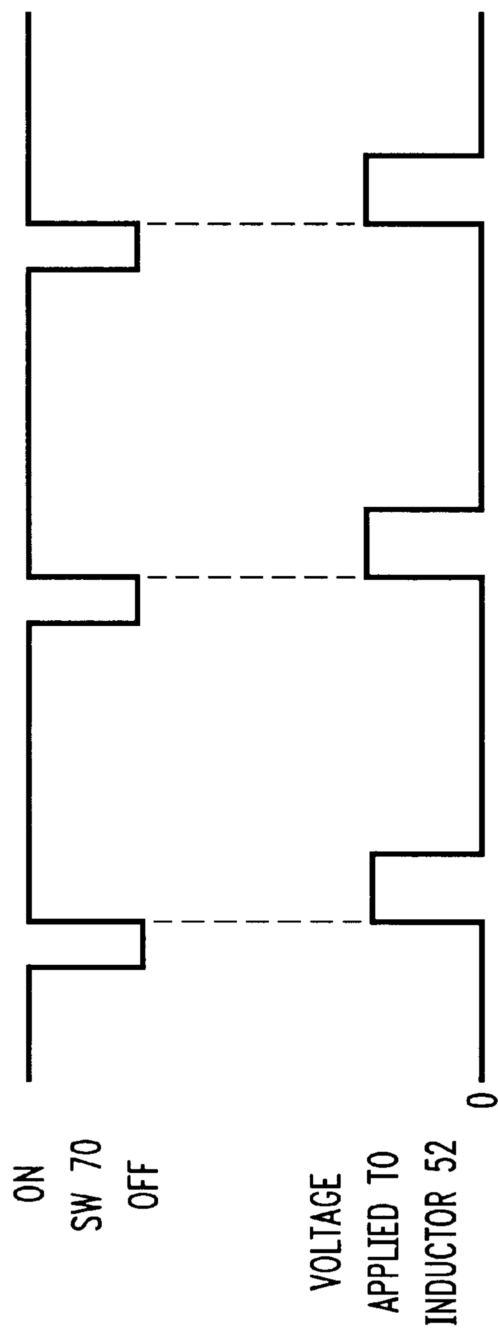
FIGS. 3*a*, 3*b*, and 3*c* illustrate timing diagrams for the present DC—DC converter.

FIGS. 3*a*, 3*b*, and 3*c* illustrate timing diagrams for the voltage across secondary winding 16, switch 70, and inductor 52 for the converter 10 illustrated in FIG. 1.

Figure 4:
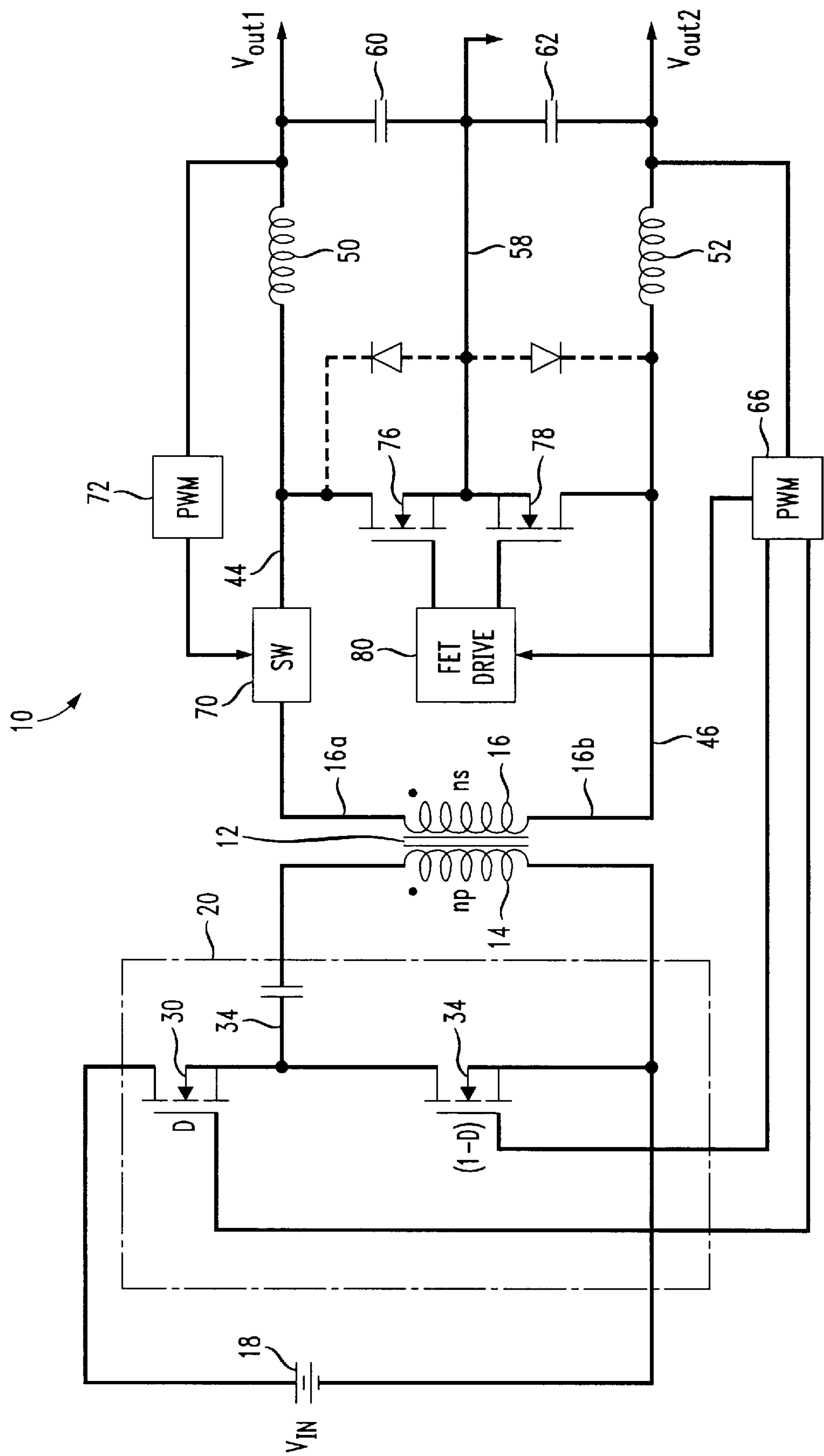
FIG. 4 is a schematic of an additional embodiment of the present DC—DC converter.

FIG. 4 illustrates converter 10 in which diodes 54 and 56 have been replaced with synchronous rectifier FETs 76 and 78, respectively, to enhance the conversion efficiency of converter 10. FETs 76 and 78 may be driven by pulse width modulator 66 which drives an FET drive circuit 80. The present invention is compatible with a variety of synchronous rectifier drive techniques, including control driven and self driven techniques.

Figure 5A:
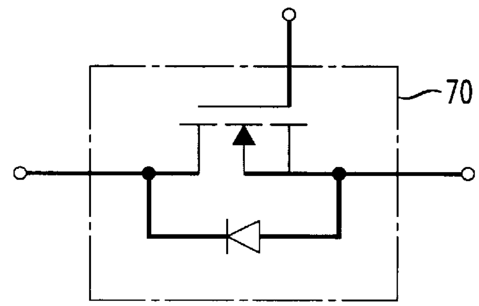
FIGS. 5*a*, 5*b*, and 5*c* illustrate embodiments of the switch 70.
Figure 5B:
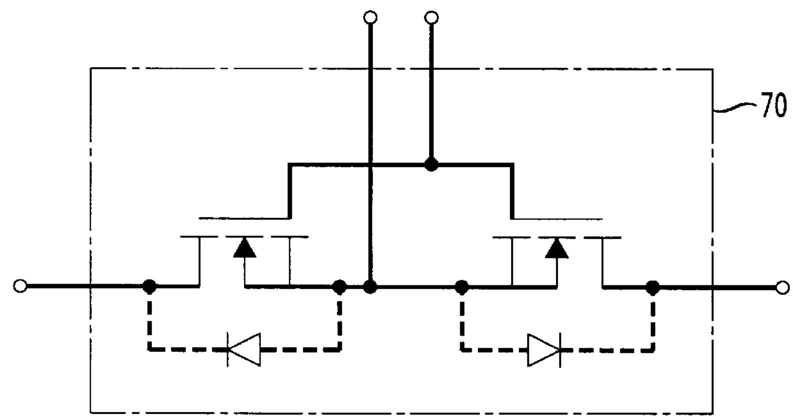
Figure 5C:
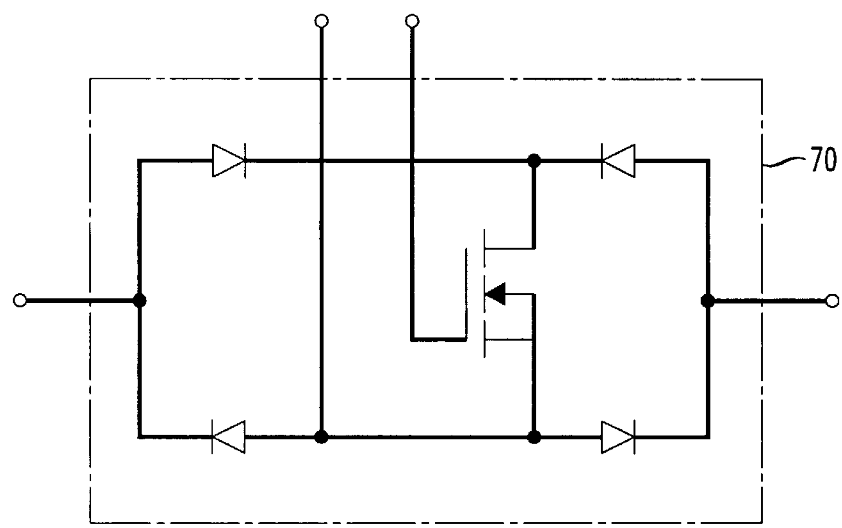

Control switch 70 may comprise, for example, an FET or a bipolar transistor each possibly having a diode connected in parallel. In a typical embodiment of converter 10 shown in FIGS. 1, 2, and 4, for example, control switch 70 is a unidirectional blocking device (FIG. 5*a*). That is, it may be selectively closed to current in one direction, but is always closed to current in the opposite direction. With such an embodiment, control switch 70 may, for example, regulate output Vout1 in FIG. 1 without interfering with the operation of Vout2. As an alternate embodiment, control switch 70 may be realized as a bi-directionally blocking device, as exemplified by FIG. 5*b*. In this embodiment, control switch 70 may be selectively closed to current in both directions, thereby allowing control switch 70 to independently regulate both output voltages. FIG. 5*c* illustrates a further embodiment of control switch 70. A bi-directionally blocking device can be embodied as a single device, such as, for example, a lateral MOSFET device. Alternative embodiments of unidirectional and bi-directionally blocking devices are well known in the art and fall within the scope of the present invention.

It therefore can be seen that the present invention provides for closed loop regulation of a multiple output converter in which independent regulation occurs using minimal circuit components.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A DC—DC converter, comprising:

a transformer having a primary winding and a secondary winding, said secondary winding including first and second terminals;

an input circuit coupled to said primary winding for coupling an input DC voltage to said primary winding;

a first output channel coupling said first terminal of said secondary winding to a first output, said first output channel including a first switch connected in series with a first inductor, said first switch having an on and off cycle time;

a second output channel coupling said second terminal of said secondary winding to a second output, said second output channel including a second inductor;

a first and a second capacitor coupling said first and second outputs to a return lead;

a second switch coupling said first output channel to said return lead;

a third switch coupling said second output channel to said return lead;

a first pulse width modulator coupled between one of said outputs to drive said input circuit; and a second pulse width modulator coupled between said first output and said first switch for controlling said first switch on and off cycle time to thereby regulate the duty cycle of said first output channel independently of said second output channel.

2. The converter of claim 1 wherein said input circuit includes:

a fourth switch connected in series with said primary winding and said input DC voltage;

a clamping circuit including a storage capacitor; and a fifth switch enabled to couple said storage capacitor to said primary winding when said fourth switch is non-conducting.

3. The converter of claim 1 wherein said input circuit is selected from the group consisting of:

a zero voltage switching half bridge; and a hard switching half bridge; and a push pull circuit; and a full bridge.

4. The converter of claim 1 wherein said second and third switches comprise synchronous rectifier FETs.

5. The converter of claim 1 wherein said second and third switches comprise diodes.

6. A DC—DC converter, comprising:

a transformer having a primary winding and a secondary winding, said secondary winding including first and second terminals;

an input circuit coupled to said primary winding for coupling an input DC voltage to said primary winding;

a first output channel coupling said first terminal of said secondary winding to a first output, said first output channel including a first inductor;

a second output channel coupling said second terminal of said secondary winding to a second output, said second output channel including a first switch connected in series with a second inductor, said first switch having an on and off cycle time;

a first and a second capacitor coupling said first and second outputs to a return lead;

a second switch coupling said first output channel to said return lead;

a third switch coupling said second output channel to said return lead;

a first pulse width modulator coupled between one of said outputs to drive said input circuit; and a second pulse width modulator coupled between said second output and said first switch for controlling said first switch on and off cycle time to thereby regulate the duty cycle of said second output channel independently of said first output channel.

7. The converter of claim 6 wherein said input circuit includes:

a fourth switch coupled in series with said primary winding and said input DC voltage;

a clamping circuit including a storage capacitor; and a fifth switch enabled to couple said storage capacitor to said primary winding when said fourth switch is non-conducting.

8. The converter of claim 6 wherein said input circuit is selected from the group consisting of:

a zero voltage switching half bridge; and a hard switching half bridge; and a push pull circuit; and a full bridge.

9. The converter of claim 6 wherein said second and third switches comprise synchronous rectifier FETs.

10. The converter of claim 6 wherein said second and third switches comprise diodes.

* * * * *